(No Model.) 2 Sheets—Sheet 1.
J. J. HICKS.
SPECIFIC GRAVITY APPARATUS.
No. 398,726. Patented Feb. 26, 1889.
FIG.1. FIG.2. FIG.5. FIG.6. FIG.8. FIG.9.
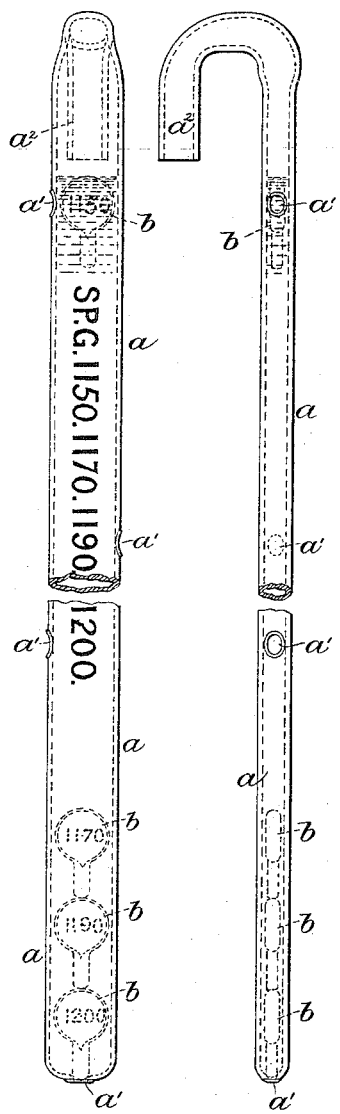
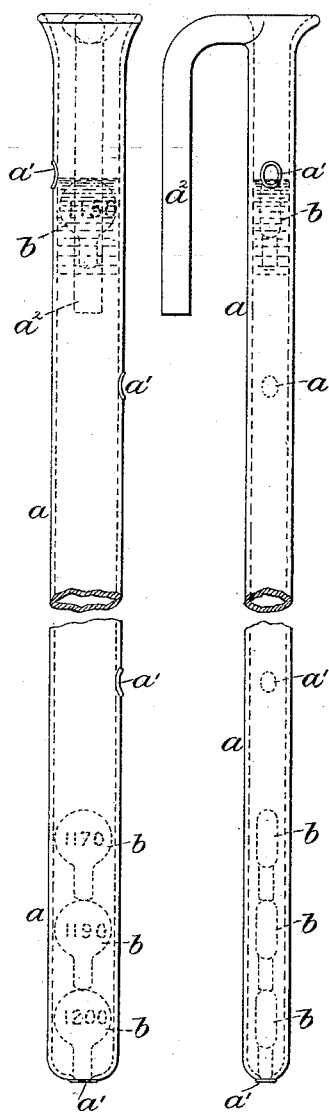
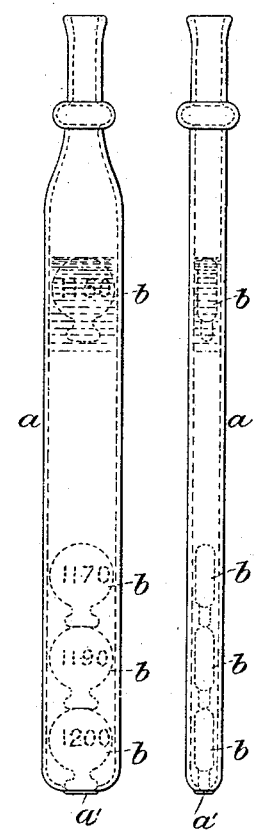
FIG.10. FIG.11.
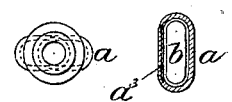
FIG.3. FIG.4. FIG.7.
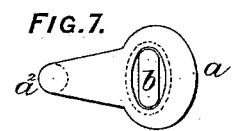
Attest:
Edward Otis,
Samuel H. Knight.
Inventor:
James Jos. Hicks
By Knight Bros
Attys (No Model.) 2 Sheets—Sheet 2.
J. J. HICKS.
SPECIFIC GRAVITY APPARATUS.
No. 398,726. Patented Feb. 26, 1889.
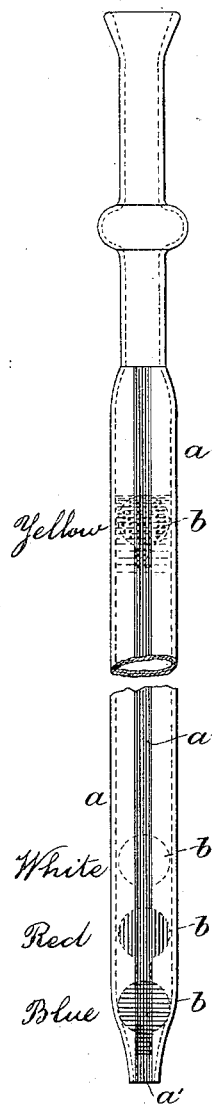
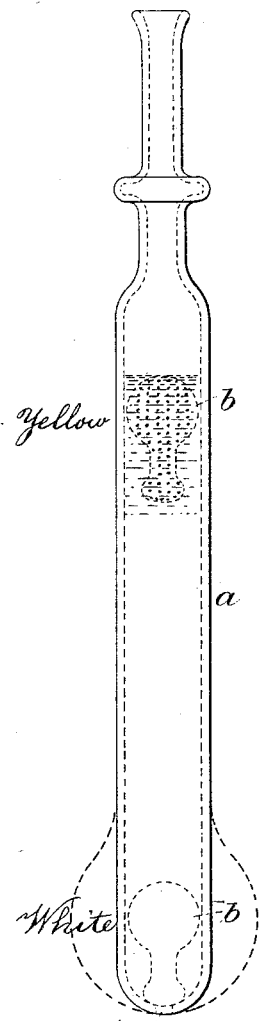
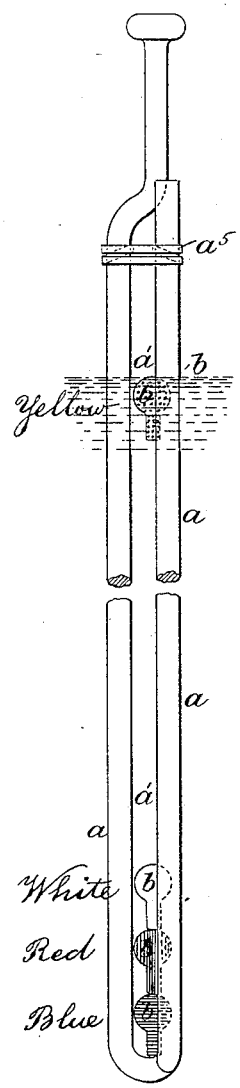
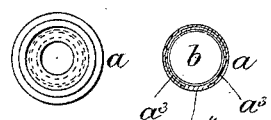
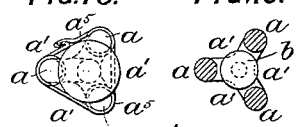

UNITED STATES PATENT OFFICE.

JAMES J. HICKS, OF HATTON GARDENS, COUNTY OF MIDDLESEX, ENGLAND.

SPECIFIC-GRAVITY APPARATUS.

SPECIFICATION forming part of Letters Patent No. 398,726, dated February 26, 1889.

Application filed June 13, 1888. Serial No. 276,910. (No model.)

*To all whom it may concern:*

Be it known that I, JAMES JOSEPH HICKS, a subject of the Queen of Great Britain, residing at 8 Hatton Gardens, in the county of Middlesex, England, meteorological-instrument manufacturer, have invented certain new and useful Improvements in Specific-Gravity Apparatus; and I do hereby declare that the following is a full, clear, and exact description of the invention, which will enable others skilled in the art to which it appertains to make and use the same.

The invention has for its object the production of new or improved instruments whereby the approximate specific gravity of liquids can be readily ascertained and indicated even in dark and difficult positions, and whereby samples of liquid can be readily withdrawn from bulk by a "pipette" and the approximate specific gravity thereof indicated therein.

In carrying my invention into effect I use ordinary glass specific-gravity "bubbles," either round or flattened and marked with figures, letters, or signs to indicate the specific gravity at which such bubbles will float; or I use, according to my invention, bubbles of various colors or patterns for such purpose, in which case each particular color or pattern will represent a given specific gravity. Instead of using these bubbles in the ordinary manner—that is to say, by dropping them loosely and separately into the liquid to be tested—I inclose them in pipettes, chambers, or containers of glass of size and form to suit the particular use to which the instrument is to be applied. These chambers may be formed of flat or round tubes provided with openings at the bottom and sides large enough to permit the ready access of liquid to the interior thereof and yet small enough to prevent the bubbles from passing out thereat. Instead of inclosing the bubbles within a tubular chamber or container, they may be confined within a container formed of (preferably) three parallel rods of glass connected together, so as to permit of the free motion of the bubbles lengthwise thereof, but which will prevent the lateral exit of the same therefrom. The chambers or containers are in some cases formed with hooks at their upper ends, which may be either solid or hollow, and they may be contracted at both their upper and lower ends, so as to prevent the possibility of the exit of the bubbles, or they may be open at the top to permit of the removal of the bubbles therefrom. In most cases the pipettes, chambers, or containers are of such size as to contain only one bubble in the cross-area thereof, in which case the bubbles are arranged therein in their order of specific gravity, the lightest being at the top; but chambers may be formed large enough or with bulbs at their lower ends to allow the bubbles to lie in bulk therein. I also, where desirable, form the pipette, chamber, or container with enamel at the back, so as to render the bubbles more readily visible.

Instruments constructed according to my invention are particularly useful for testing the acid in storage-batteries and for testing urine, spirits, milk, and acids; but they are also useful for testing other liquids.

My invention is illustrated in the accompanying drawings, in the various figures of which like parts are indicated by similar letters of reference.

Figure 1 is a front elevation. Fig. 2 is a side or edge elevation. Fig. 3 is a cross-section, and Fig. 4 is a top view or plan, of an instrument constructed for use in storage-batteries and other like receptacles where it is desirable that the instrument should be constantly immersed for the purpose of indicating any variation in the strength or specific gravity of the liquid contained therein. Figs. 5, 6, and 7 are respectively a front elevation, a side or edge elevation, and a top view or plan of a slightly-modified form of instrument to be used for a similar purpose to that of the instrument represented at Figs. 1 to 4. Figs. 8, 9, 10, and 11 are respectively a front elevation, an edge or side elevation, a top view or plan, and a cross-section of an instrument capable of being used for the withdrawal of a sample from liquid in bulk and approximately indicating the specific gravity thereof. Figs. 12, 13, and 14 are respectively a front elevation, a top view or plan, and a cross-section of a slightly-modified form of instrument to be used for a similar purpose to that of the instrument represented at Figs. 8 to 11. Fig. 15 is a side elevation, and Fig. 16 is a top view or plan, of a slightly-modified form of instrument to be used for a similar purpose to that of the instrument represented at Figs. 8 to 14; and Figs. 17, 18, and 19 are respectively a side elevation, a top view or plan, and a cross-section of a modified construction of instrument to be suspended or plunged into a body of liquid to indicate while in such liquid the approximate specific gravity thereof.

$a$ represents the glass chamber or container, $a'$ openings or passages of communication for permitting liquid freely to enter and leave such chamber or container, and $b\ b$ specific-gravity bubbles inclosed in the chamber or container $a$, and in combination therewith forming my new or improved instrument for ascertaining the approximate specific gravity of liquids.

The chamber or container $a$ represented at Figs. 1 to 4 is formed of a flattened glass tube provided with a number of openings or passages, $a'$, in the sides or edges, and one in the bottom to permit of the free entry, circulation, and exit of the liquid to be tested. In this case the upper end of the chamber or container is blown into the form of a hollow hook, $a^2$, by which the instrument may be suspended in the liquid to be tested, but so formed or contracted as to prevent the possibility of the specific-gravity bubbles $b\ b$ being removed from or falling out of the container or chamber $a$. The container or chamber $a$ represented at Figs. 5 to 7 is also formed of flattened or oval tubing with a number of openings or passages, $a'$, therein; but it is provided at one side of the upper end with a solid glass hook, $a^2$, while such upper end is left of the full size of the tube to enable the specific-gravity bubbles $b\ b$ to be readily inserted therein and removed therefrom, by which means the instrument may be readily modified by the employment of different sets of specific-gravity bubbles to render it suitable for testing the specific gravity of different classes of liquids.

The instrument represented at Figs. 8 to 11 has the container or chamber $a$ also formed of a flattened tube; but it is provided with only one opening or passage, $a'$, therein, such being at the lower end. It is also open at its upper end, but is so contracted as to securely retain the specific-gravity bubbles $b\ b$, while in order to render the latter more readily visible I form the back of the container or chamber $a$ with a layer, $a^3$, of enamel therein. This instrument may be employed as a pipette for withdrawing samples of liquid from the bulk, and at the same time exhibiting their approximate specific gravity, or it may be thrust into liquid with both ends open and exhibit the approximate specific gravity thereof while immersed therein.

The instrument represented at Figs. 12 to 14 has the chamber or container $a$ in the form of a pipette, opened only at each end, both of which are so contracted as to retain the specific-gravity bubbles $b\ b$ therein; but in this case the chamber or container $a$ is formed with a layer, $a^3$, of enamel embedded therein and almost entirely surrounding the same, but leaving a narrow space, $a^4$, of clear glass, through which the specific-gravity bubbles are readily visible.

The instrument represented at Figs. 15 and 16 is of very similar construction to that shown at Figs. 12 to 14, except that it is made entirely of clear glass, is of larger diameter, but shorter in length.

The instrument represented at Figs. 17 to 19 has the chamber or container $a$ formed of three parallel rods of glass united at the lower end by blowing, and held together at the upper end by a metal band or tie, $a^5$. The specific-gravity bubbles $b\ b$ are placed in the space between the three parallel rods, and are of such a proportionate diameter that while they are free to rise and fall therein they cannot fall out therefrom. By removing the band or tie $a^5$ from the parallel rods the specific-gravity bubbles $b\ b$ can be readily inserted within the container $a$ or removed therefrom.

The specific-gravity bubbles $b\ b$ may, as heretofore, be engraved with a figure representing the specific gravity thereof, as shown in Figs. 1, 5, and 8; but according to my invention I form them of glass of different colors or patterns, as shown in Figs. 12, 15, and 17, so that by a simple glance, without the necessity for reading any figures or signs, the specific gravity may be at once ascertained.

It will be seen that the chambers or containers are of such size as to contain only one bubble in the cross-area thereof, the bubbles being arranged therein in their order of specific gravity, the lightest being at the top; but, if desired, the chambers or containers may be formed large enough, or with a bulb at the lower end thereof, as represented by the dotted circle in Fig. 15, to allow the bubbles to lie in bulk therein.

Having now particularly described and ascertained the nature of my said invention and in what manner the same is to be performed, I declare that what I claim is—

1. A pipette having openings, substantially as described and shown, provided with bubbles of different specific gravity confined therein in such a manner as to permit them to rise in the order of their gravity, the lightest first.

2. The combination of bubbles of different specific gravity with a pipette chamber or container inclosing the same and provided with openings to permit of the free passage of the liquid to be tested into and out of said pipette chamber or container and with a hook, by which the said instrument can be suspended in the liquid to be tested, substantially as herein shown and described.

3. A pipette having openings, substantially as described and shown, provided with bubbles of different specific gravity and of various colors or patterns confined therein in such a manner as to permit them to rise in the order of their gravity, the lightest first.

4. A pipette chamber or container having openings, substantially as herein described and shown, provided with bubbles, one above another, with the heaviest bubble at the bottom, and gradually decreasing in specific gravity toward the top.

JAS. J. HICKS.

Witnesses:
B. J. B. MILLS,
C. M. WHITE,
*Both of 23 Southhampton Buildings, London.*